United States Patent [19]

Tanaka

[11] Patent Number: 5,079,718
[45] Date of Patent: Jan. 7, 1992

[54] KNOWLEDGE DATA MANAGEMENT METHOD AND APPARATUS WITH CANCEL FUNCTION

[75] Inventor: Kazuaki Tanaka, Sagamihara, Japan

[73] Assignee: Hitachi, Ltd., Tokyo, Japan

[21] Appl. No.: 418,214

[22] Filed: Oct. 6, 1989

[30] Foreign Application Priority Data

Oct. 7, 1988 [JP] Japan ............................... 63-251766

[51] Int. Cl.⁵ .......................................... G06F 15/18
[52] U.S. Cl. ................................ 395/75; 364/274.5; 364/274.7; 364/DIG. 1; 395/77
[58] Field of Search ...................... 364/513, 200

[56] References Cited

U.S. PATENT DOCUMENTS

| | | | |
|---|---|---|---|
| 3,949,368 | 4/1976 | West | 340/172.5 |
| 3,958,228 | 5/1976 | Coombes | 340/172.5 |
| 4,181,937 | 1/1980 | Hattori | 364/200 |
| 4,530,055 | 7/1985 | Hamstra | 364/200 |
| 4,809,219 | 2/1989 | Ashford | 364/513 |
| 4,860,213 | 8/1989 | Boinissone | 364/513 |

FOREIGN PATENT DOCUMENTS

63-24647 2/1985 Japan.
60-24647 2/1985 Japan.
63-298669 12/1988 Japan.

OTHER PUBLICATIONS

Spillman, "Managing Uncertainty with Belief Functions", *AI Expert*, May 1990, pp. 44–49.
Ng et al., "Uncertainty Management in Expert Systems", *IEEE Expert*, Apr. 1990, pp. 29–48.
D'Ambrosio, Bruce, "Insight-A Knowledge System", *Byte*, Apr. 1985.

*Primary Examiner*—Michael R. Fleming
*Assistant Examiner*—Roger S. Joyner
*Attorney, Agent, or Firm*—Antonelli, Terry, Stout & Kraus

[57] ABSTRACT

In a knowledge data management apparatus, the impact of the methods for acquiring knowledge data are digitized as storage impact numbers which represent the importance degree of being stored, the storage impact numbers are stored together with the knowledge data, the storage impact numbers are changed in accordance with the elapsed storage time, frequency of use and object in which the knowledge data is used, and the knowledge data having a smaller storage impact number than a predetermined value on the basis of a manageable amount of the knowledge data are canceled.

25 Claims, 6 Drawing Sheets

F I G. 3
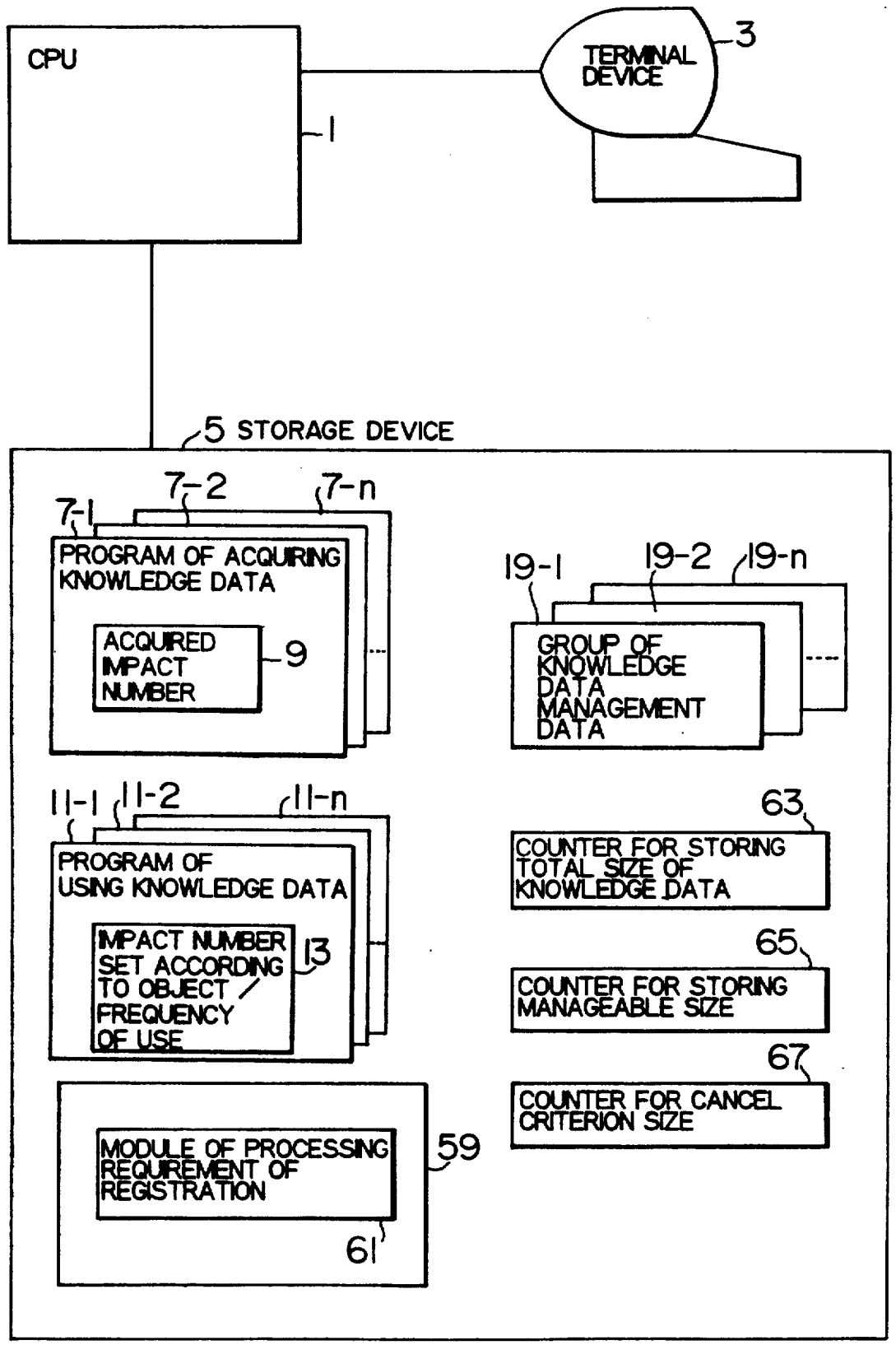

KNOWLEDGE DATA MANAGEMENT METHOD AND APPARATUS WITH CANCEL FUNCTION

BACKGROUND OF THE INVENTION

The present invention relates to a method and apparatus for managing knowledge data having a function of canceling stored knowledge data, in a system of storing and managing knowledge data.

The previously known system of storing and managing knowledge data, as disclosed in JOHO SHORI KENKYU HOKOKU VOL. 85, No. 7, 1985 41-6 knowledge base management system (KBMS), does not have the function of automatically canceling stored knowledge data on the basis of a certain criterion; and whether the individual knowledge data to be canceled is judged by a user and the operation therefor is performed by the user.

There has also been proposed in JP-A-60-24647 a method of managing knowledge data in which as a criterion of selecting competing rules (knowledge data), each knowledge data is supplied with an evaluation index including elapsed time for deciding whether the knowledge data is to be adopted in comparison with the other knowledge data in order to deal with a certain situation, and when new knowledge data is acquired, the knowledge data with a low evaluation index is replaced.

In the above related arts, acquired knowledge data were increased unlimitedly, and also if the stored data should be partially canceled owing to the limitation in the physical capacity of the storage medium in which the knowledge data are stored, the data to be canceled and the data to be still stored were manually distinguished. Thus, it takes a lot of time and labor to use and manage the knowledge data.

Further, in the technique disclosed in JP-A-60-24647 above, when the knowledge data to be still stored should be selected owing to the limitation in the storage capacity, it was difficult to automatically decide which of not-competing more general knowledge data, e.g. fact data should be canceled or still stored.

Moreover, if competing knowledge data are also replaced wholly by new knowledge data, only the not-competing knowledge data are left.

Accordingly, the related arts mentioned above did not have a criterion of selecting the knowledge data to be still stored in accordance with their degree of importance of storage.

SUMMARY OF THE INVENTION

An object of the invention is to provide a method and apparatus for automatically managing the amount of knowledge data not in accordance with a criterion of selecting competing knowledge data but in accordance with a criterion of distinguishing the knowledge data to be canceled from the knowledge data to be still stored on the basis of their degree of importance of storage, thereby managing the knowledge data without unlimitedly increasing the amount of the knowledge data to be acquired and subsequently stored.

A human being memorizes in his brain all the facts obtained using the five senses, knowledge data or data in terms of computer terms. The feature of the memory resides in that the memory period is uncertain, and it does not occur that the memory amount exceeds a certain memory capacity to prohibit further memory. Also it is characterized that an erroneous fact is not forgotten, but the fact that the fact is erroneous is memorized.

The present invention relates to a method and apparatus for storing and managing knowledge data which simulates the memorizing manner of knowledge by a human being.

More specifically, the present invention comprises the following steps:

(a) in accordance with that the memory period of knowledge is varied according to impact in acquiring the knowledge, the impact in memorizing knowledge data is digitized on the basis of a great variety of manners of acquiring knowledge data and it is stored together with the knowledge data, (b) in accordance with that the memory of knowledge is activated according to a great variety of objects in which the knowledge data is used and frequencies of using the knowledge, the impact is reset according to the object and frequency of using the knowledge data, dim with elapsed time, the impact is decreased according to the elapsed time, and (d) in accordance with the knowledge with less impression to a brain cell is forgotten faster, the knowledge data with a smaller number of impact is selected and forgotten (canceled).

The impact in storing the knowledge data is digitized in such a manner that the knowledge data acquired by a user by interacting with a computer is imparted with a high score as a storage impact number, and the knowledge data collectively fetched into a data base such as the contents of an encyclopedia is imparted with a low score. The score to be imparted to the knowledge data is dependent of the user. For example, if the user desires to handle the acquired knowledge data equivalently, these knowledge data are imparted with the same score.

The storage impact number decreases as the time elapses, and the storage impact number is also changed in accordance with the frequency and object of using the knowledge data. More specifically, if the acquired knowledge data is used frequently regardless of the purpose for which the knowledge data is used or is taken as a candidate to be used, its storage impact number is reset to a high score. Moreover, a method for changing the storage impact number in accordance with the object is predetermined. Using this method, the storage impact number is suddenly increased or decreased to n times or 1/n (n : an integer). For example, when the acquired knowledge data has been used as data for stock investment, its score is increased ten times. In this case, if the investment has ended in failure, its score is decreased to one-half. In this way, the storage impact number is changed in accordance with the object in which the data is used by a function of changing the storage impact number to several times or a fraction.

The knowledge data are managed in such a manner that the knowledge data having smaller storage impact numbers than the storage impact number to be canceled, which is inputted by a user, are canceled, and thus such useless knowledge data with small storage impact number can be indiscriminately placed out of management.

Moreover, if the amount of the knowledge data exceeds a manageable amount, the knowledge data are automatically canceled in accordance with their storage impact number so that the management amount falls less than a certain value. Thus, the knowledge data can be managed with good operability.

The knowledge data which have a small storage impact number and are not likely to be used may be not canceled but automatically transferred to a memory medium with a low access speed for holding the data. Thus, a relatively expensive memory medium with a high access speed can be efficiently used.

Furthermore, the following steps (1) to (4) of management permit a changed value of the storage impact number to be easily set in accordance with the manner of acquiring the knowledge data or the object in which the knowledge data is used and also the method of changing the storage impact number to be easily set.

(1) A correspondence table between methods of acquiring knowledge data and storage impact numbers is previously stored.

(2) A correspondence table between the objects in which the knowledge data is used and the methods of changing its storage impact number is previously stored.

(3) The knowledge data is added with the method of acquiring the knowledge data, which is informed from the program having acquired that knowledge data, and with the storage impact number obtained from the corresponding table of (1). Thereafter, these items of information are stored in a memory medium for storing knowledge data.

(4) The storage impact number of the knowledge data is changed on the basis of the object of using it, which is informed from the program using it, and the corresponding table of (2).

In accordance with the present invention, when the amount of stored knowledge data reaches a limit because of physical limitation, the knowledge data are managed so that the knowledge data with a larger storage impact number remains stored for a longer time. Therefore, the knowledge data can be managed without losing the knowledge data with a stronger possibility of being used.

Furthermore, in accordance with the present invention, when the amount of stored knowledge data exceeds a certain amount, the knowledge data management system cancels automatically the knowledge data to that amount. Therefore, it becomes conveniently unnecessary for a manager for the knowledge data to perform the management operations such as the selection of knowledge data to be calceled, the cancellation thereof, etc.

BRIEF DESCRIPTION OF THE DRAWINGS

FIG. 3 is a view showing the entire arrangement of a second embodiment of the present invention;

DESCRIPTION OF THE PREFERRED EMBODIMENTS

Figure 1:
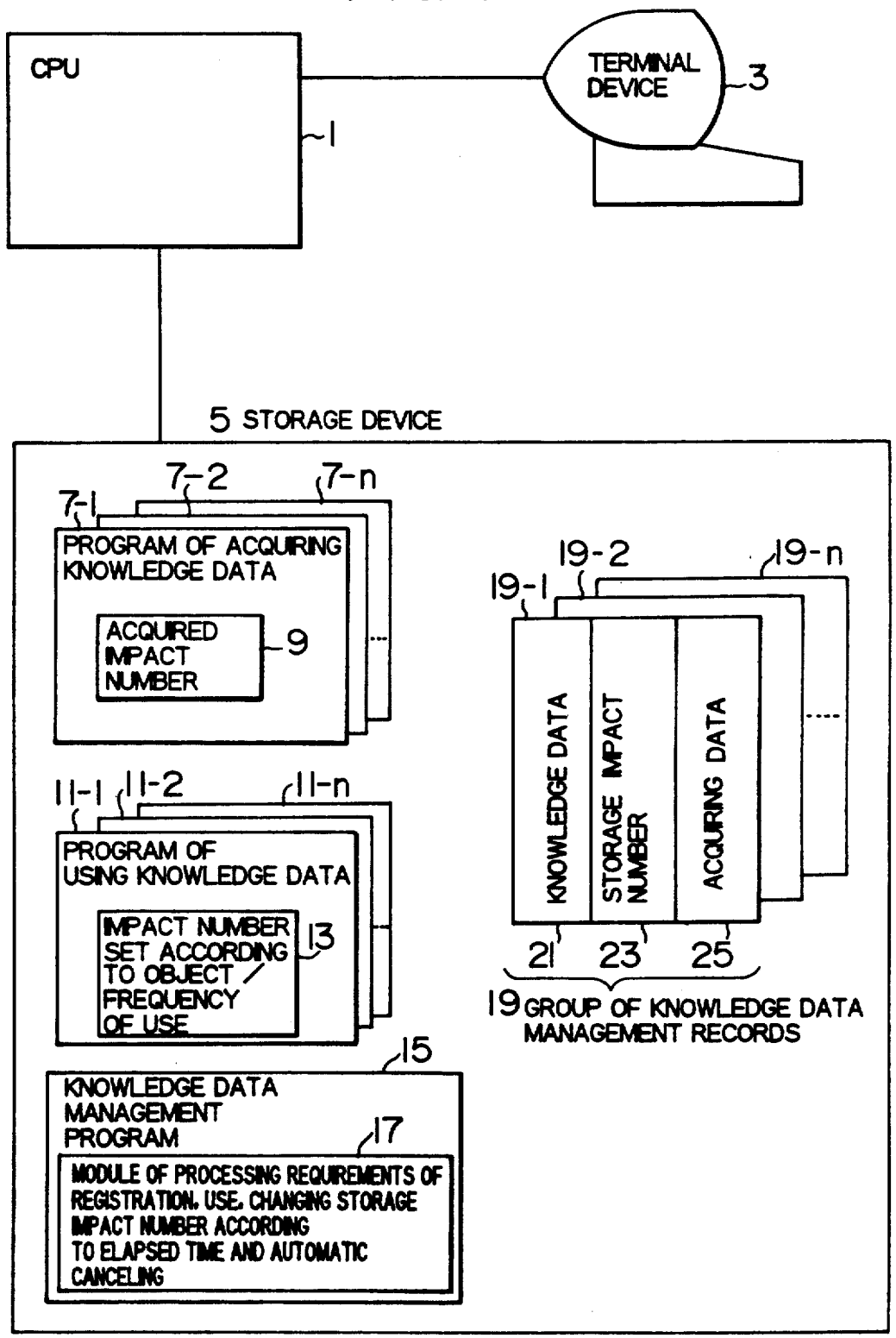
FIG. 1 is a view showing the entire arrangement of a first embodiment of the present invention.

Now referring to the drawings, several embodiments of the present invention will be explained.

Embodiment 1

FIG. 1 shows the entire embodiment of a first embodiment of the present invention. In FIG. 1, 1 is a CPU (Central Processing Unit); 3 is a terminal device from which knowledge data are inputted by a user, in which the knowledge data are used, and from which a change requirement of the storage impact number of the knowledge data due to elapsed time and a cancel requirement of the knowledge data having a smaller storage impact number than a predetermined value are issued; 5 is a storage (memory) medium such as a main storage, a magnetic disk device, an optical disk device, etc.; 7 is a group of programs 7-1, 7-2, ..., 7-n for acquiring knowledge data, each including an acquiring impact number 9 set in accordance with the acquiring method; 11 is a group of programs 11-1, 11-2, ..., 11-n for using the knowledge data, each including a using impact number 13 set in accordance with the object and frequency of using the knowledge data; 15 is a program for managing the knowledge data, including a processing module 17 corresponding to the requirements of registering of a knowledge data, using of it, changing of its storage impact number according to elapsed time, and automatically canceling of it; and 19 is a group of records 19-1, 19-2, ..., 19-n for managing knowledge data, each composed of a knowledge data 21, a storage impact number 23 and an acquiring data 25.

Incidentally, 3 is representative of the interface between the knowledge data and its user or manager and so may be another device or program for using or managing the knowledge data. This is also true of the other embodiments. Moreover, each of the records 19-1, 19-2, ..., 19-n is a data unit which is accessible and permits registration, cancellation, and change, etc therefore.

Furthermore, the construction of the knowledge data in the present invention is indefinite. It may be any of numerical data, character data, graphic data, image data, sound data, etc. or a collection of data composed of several components.

There are several methods of acquiring knowledge data such as storing, as knowledge data, fact data, or object data composed of data and their processing in accordance with an instruction by a user, and when the data lead by inference is adopted by a user, automatically storing its inference path as knowledge data. However, in the present invention, the method of acquiring the knowledge data is not defined, but the storage impact number is set in accordance with the method. This is also true of the object in which the knowledge data is used.

Figure 2:
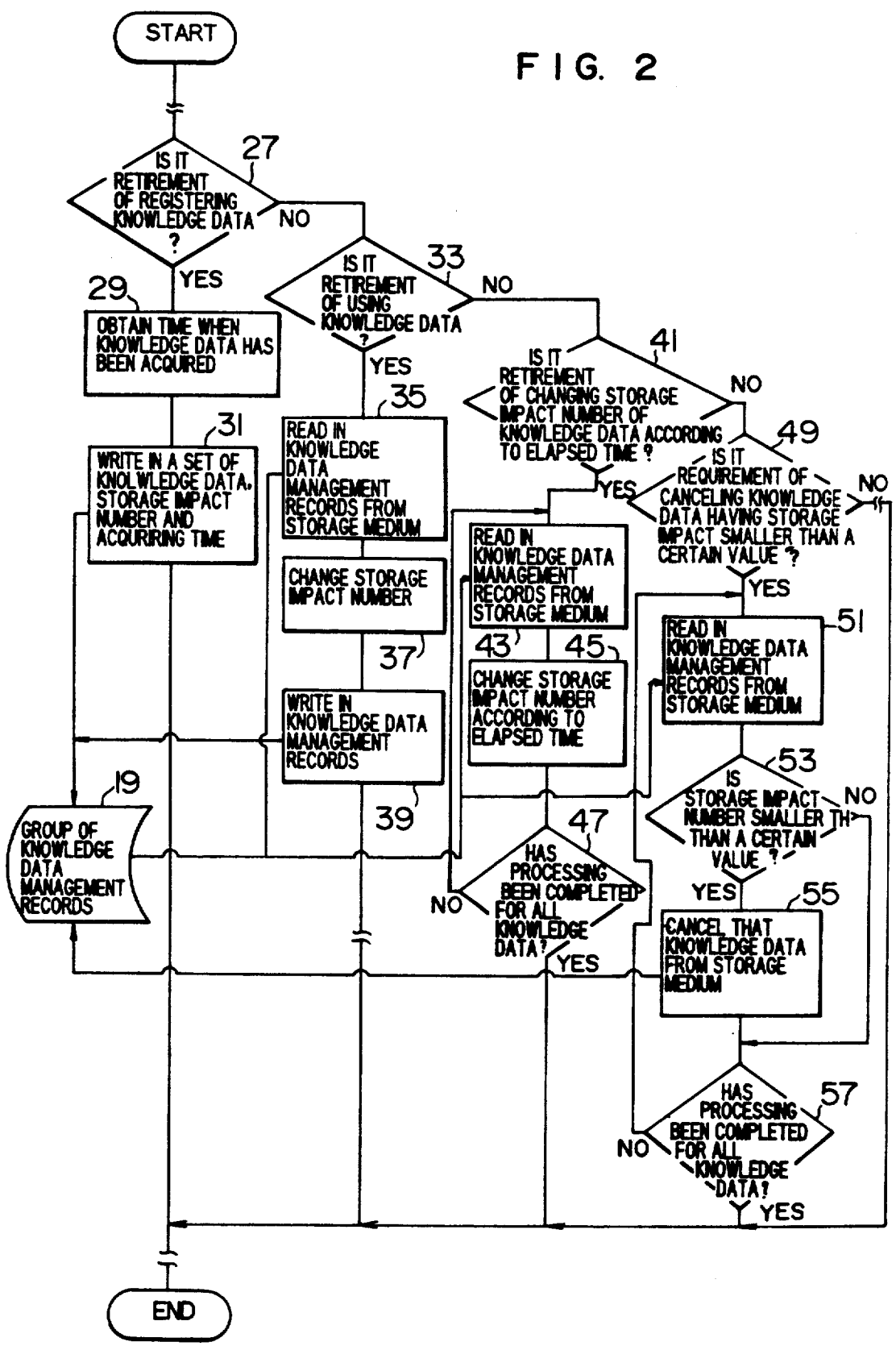
FIG. 2 is a processing flow diagram of the processing module 17 in FIG. 1.

Referring to FIG. 2, explanation will be given for the processings of the processing module 17 in the program 15 for managing knowledge data. In the processing module 17, registering of knowledge data, using of them, changing of their storage impact number due to elapsed time, and automatic canceling of them are carried out in response to the requirements of registering of the knowledge data from the group of programs 7 which have acquired them, of using of them from the group of programs 11, and of changing their storage impact number in accordance with elapsed time and of automatically canceling the knowledge data having a smaller storage impact number than a predetermined value.

Additionally, in requiring the above registering, the group of programs which have acquired the knowledge data inform the management program of the storage impact number previously set in accordance with the acquiring method as well as the acquired knowledge data.

Further, in requiring the above method of use, the group of programs using the knowledge data inform the management program of a changed value of the storage impact number or a method of changing it which has been previously set in accordance with the object in which the knowledge data is used as well as the knowledge data.

First, when the processing module 17 is activated, whether the object of activation is a requirement of registration of a knowledge data is decided (27). If it is 'YES', the time when the knowledge data has been acquired is obtained (29). Thereafter, a set of the knowledge data, its storage impact number and its acquired time are written in the medium 19 for storing the knowledge data management records (31).

If it is 'NO', whether it is a requirement of using the knowledge data is decided (33).

If it is 'YES', the knowledge data management records are read in from the storage medium 19 (35). The read-in storage impact number of the knowledge data is changed to a new storage impact number told from a use requiring source or based on the changing method predetermined in accordance with an object in which the knowledge data is used (37). The new storage impact number based on the changing method is obtained by a function which provides the storage impact number n-times or 1/n (n : an integer) in comparison with the original storage impact number. Thereafter, the knowledge data management records are written in the storage medium (39). The processing of transferring the knowledge data to the use requiring source, etc. is made to complete the processing in the module 17.

If it is not the requirement of using the knowledge data, whether it is a requirement of changing the storage impact number of the knowledge data due to elapsed time is decided (41). If it is 'YES', the knowledge data management records are read in from the storage medium 19 (43), and the storage impact number is changed on the basis of the elapsed time (45). In this case, although the degree of reducing the storage impact number is decided by a function having the elapsed time as a parameter, the function itself is not defined in the present invention.

Next, whether the storage impact numbers of all the knowledge data have been changed on the basis of the elapsed time is decided (47), if it is 'NO', the processing of step 43 et seq. are repeated. If it is 'YES', the processing in the module 17 is completed.

If the object of activation is not the requirement of changing the storage impact number, whether it is a requirement of canceling the knowledge data having a smaller storage impact number than a certain value is decided (49). If it is 'YES', the knowledge data management records ,are read in from the storage medium 19 (51), and whether the storage impact number is smaller than the certain value is decided (53). The certain value may be predetermined or provided by a user for each requirement of cancel. If it is 'YES', that knowledge data records are canceled from the storage medium 19 (55). If it is 'NO', the processing of, step 57 et seq. are performed. In the step 57, whether the cancel operation has been completed for all the knowledge data is decided. If it is 'NO', the processings of step 51 et seq. are repeated. If it is 'YES', the processing in the module 17 is ended.

Additionally, if the knowledge data having a minimum storage impact number is to be canceled, when the knowledge data management records are read in from the storage medium 19, the storage impact numbers are once stored; after the stored numbers are checked for all the knowledge data, the knowledge data having the minimum number is canceled. Thus, the knowledge data can be managed without increasing unlimitedly the knowledge data to be consecutively stored.

Embodiment 2

FIG. 3 shows the entire arrangement of a second embodiment of the present invention. In the first embodiment, when the management amount of knowledge data approaches a physical limit, a user inputs the maximum storage impact number of the knowledge data to be canceled, and the knowledge data having a smaller storage impact number that it is canceled. On the other hand, in this embodiment, when the amount of knowledge data exceeds a manageable amount (size) owing to the registration of new knowledge data, the knowledge data are automatically reduced or canceled to a predetermined amount.

In FIG. 3, 59 is a knowledge data management program; 61 is a module of processing the requirement for registration in 59; 63 is a counter for additively storing the total data size (memory capacity) of knowledge data; 65 is a counter for storing the manageable size for the knowledge data; and 67 is a counter for providing a criterion size which is that amount of the knowledge data which can be consecutively stored with some margin in comparison to the maximum manageable amount of data. It is assumed that the respective sizes in the counters 65 and 67 are previously set by a user.

Figure 4:
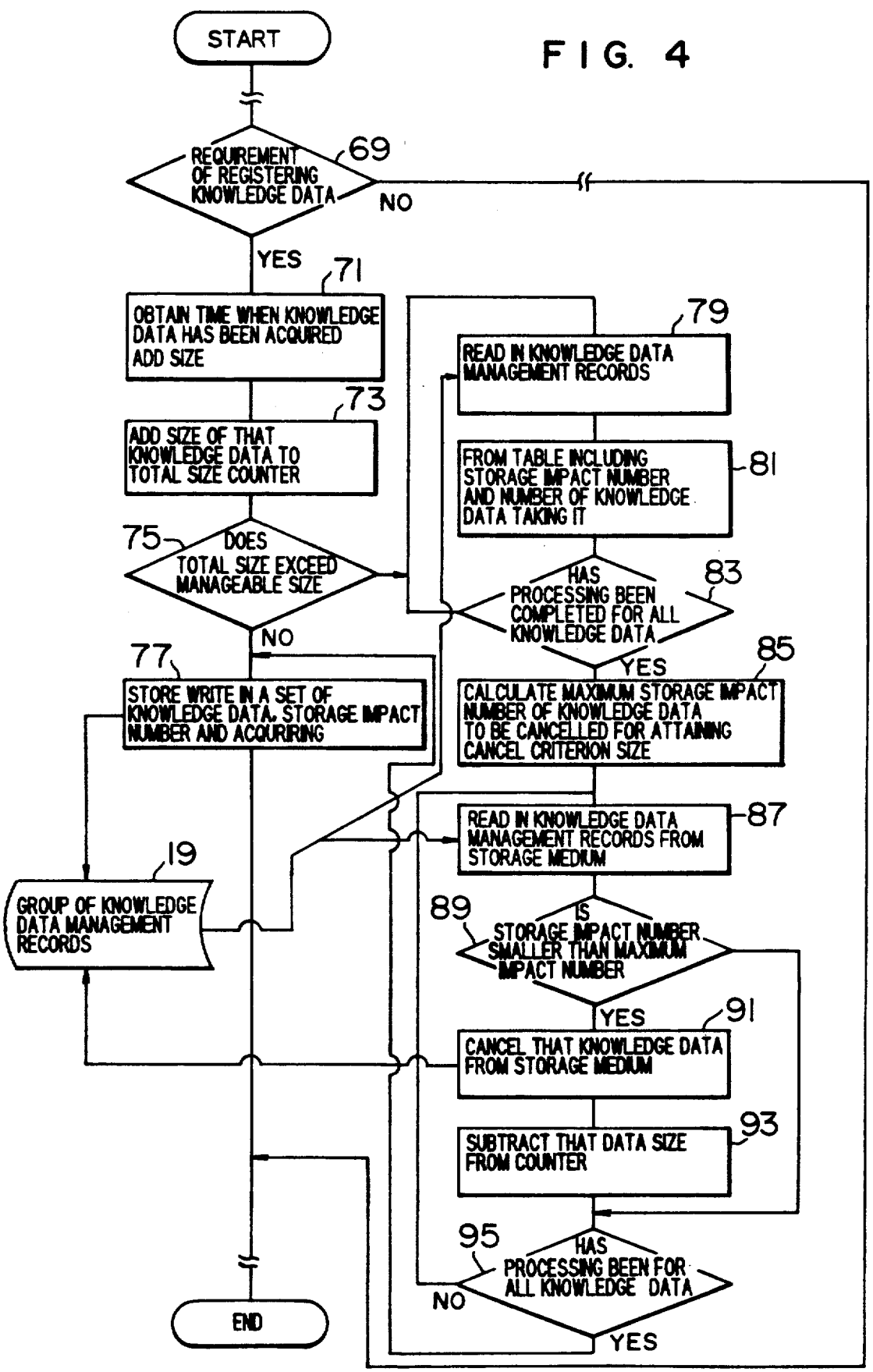
FIG. 4 is a processing flow diagram of the processing module 61 in FIG. 3.

Referring to FIG. 4, explanation will be given for the processing flow in the module 61 in response to the requirement of registration of knowledge data from the group of programs 7 for acquiring the knowledge data to the knowledge data management program 59.

When the processing module 59 is activated, whether the object of activation is a requirement of registration of the knowledge data is decided (69). If it is 'YES', the time when a knowledge data has been acquired is obtained (71). The size of that knowledge data is added to the counter 63 which stored the total knowledge data size (73).

The total knowledge data size stored in the counter 63 is compared with the manageable size stored in the counter 65 (75). If the former does not exceed the latter, a set of the knowledge data, its storage impact number, and its acquired time are written in the storage medium 19 of knowledge data management records (77). On the other hand, if the former exceeds the latter, knowledge data management records are read in from the storage medium 19 (79). A table including the storage impact number and number of the knowledge data having that impact number is formed (81). Whether search for forming a table for all the knowledge data has been completed is decided (83). If it is 'NO', the processings of step 79 et seq. are repeated. If it is 'YES', in order to reduce the capacity of the knowledge data to be consecutively stored to a criterion size for cancel or less, the maximum storage impact number of the knowledge data to be canceled is calculated on the basis of the above table (85). Incidentally, the criterion size for cancel which indicates the total capacity of the knowledge data to be consecutively stored may be previously set, set in a ratio for the total capacity of the storage medium, or provided by a user in requiring the cancel.

In step 87, a knowledge data is read in from the storage medium 19, and whether its storage impact number is smaller than the above maximum value is decided (89). If it is 'YES', that knowledge data is canceled from the storage medium 19 (91). Further, the size of that knowledge data is subtracted from the counter 63 representing the total storage size of knowledge data (93).

If the storage impact number of that knowledge data is the maximum value, the processings of step 95 et seq. are performed.

In step 95, whether the above decision has been made for all the knowledge data is decided. If it is 'NO', the processings of step 87 et seq. are performed. If it is 'YES', the processings of step 77 are performed to store the knowledge data management records of the knowledge data the registration of which has been required this time.

Additionally, the processes requirements other than the registration are carried out in the same manner as in the first embodiment. The updating of the counter 63 in step 93 may be performed after the cancel decision and cancel processing for all the knowledge data in such a manner that the data size to be reduced is calculated from the above table and is subtracted from the total storage size stored in the counter 63.

In the processing in step 85, a criterion of reducing the total capacity of the knowledge data to be consecutively stored to a certain value was provided. However, there may be provided such a criterion as consecutively storing at least the knowledge data having the storage impact number when the storage capacity reaches a certain value.

Thus, since the amount of the knowledge data does not exceed a certain value and also the knowledge data with a higher impact number can be consecutively stored from a longer time, knowledge data can be managed without losing the knowledge data with a stronger possibility of being used.

Moreover, in step 91, the knowledge data to be canceled may be transferred to the other storage medium. The other storage medium may be a recording medium with lower cost than the storage medium 5 and dedicated to retention, which permits the storage medium to be used efficiently.

Embodiment 3

Figure 5:
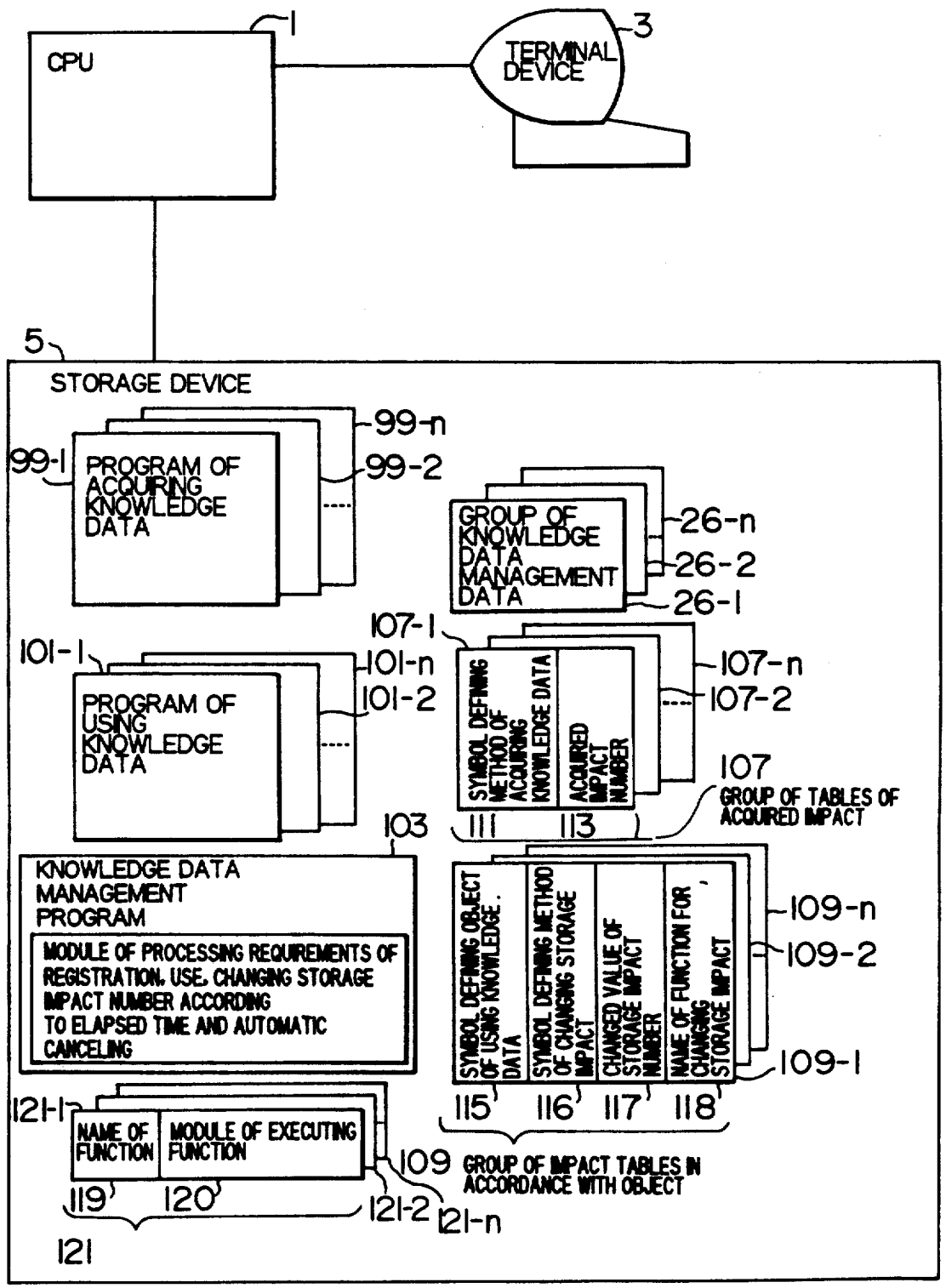
FIG. 5 is a view showing the entire arrangement of a third embodiment of the present invention.

FIG. 5 shows the entire arrangement of a third embodiment of the present invention. In FIG. 5, 99 is a group of programs 99-1, 99-2, ..., 99-n of acquiring knowledge data; 101 is a group of programs 101-1, 101-2, ..., 101-n of using the knowledge data; 103 is a program of managing the knowledge data; 105 is a module of processing the requirements of registering a knowledge data, using of it, changing of its storage impact number according to elapsed time, and automatic canceling of it; 107 is a group of acquired impact tables 107-1, 107-2, ..., 107-n each consisting of a symbol 111 indicative of the method of acquiring the knowledge data and a storage impact number 113 provided to the knowledge data as an initial value; 109 is a group of impact tables 109-1, 109-2, ..., 109-n which are determined in accordance with the object in which the knowledge data is used; 115 is a symbol defining the object in which the knowledge data is used; 116 is symbol defining if the storage impact number should be changed by a function, a changed value, or both of them; 117 is the changed value; 118 is the name of the function for changing the storage impact number; and 121 is a group of function programs 121-1, 121-2, ..., 121-n for changing the storage impact number. The program 121 is accessed using the name 118 of the function of changing the storage impact number as a key word, and is composed of the same function name 119 as 118 and a function executing module 120. The function represented by the name 118 of the function of changing the storage impact number may be, for example, a function of increasing or decreasing the storage impact number before change to n times or 1/n (n : an integer). In the present invention, the kind of the function is not defined. Further, the method of changing the impact number depends on the purpose for which the knowledge data is used. Accordingly, the order of operation of the function for the changed value is not fixed and depends on the purpose for which the knowledge data is used.—after "is not defined."

Figure 6:
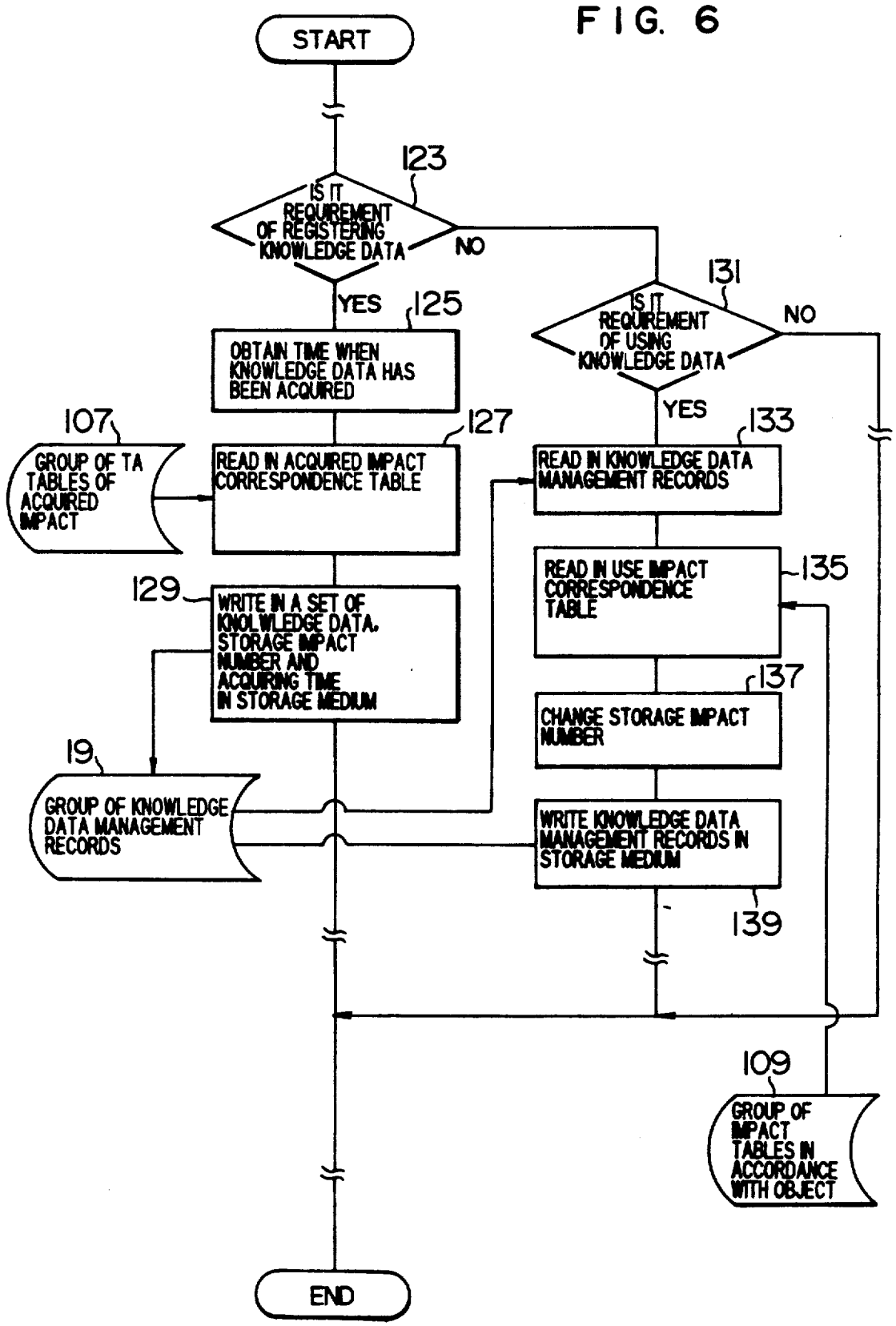
FIG. 6 is a processing flow diagram of the processing module 105 in FIG. 5.

Referring to FIG. 6, explanation will be given for the processings of the processing module 105 in the program 103 for managing knowledge data. In the processing module 105, registering of knowledge data, using of them, changing of their storage impact number due to elapsed time, and automatic canceling of them are carried out in response to the requirements of registering of the knowledge data from the group of programs 99 which have acquired them, of using of them from the group of programs 101, and of changing their storage impact number in accordance with elapsed time and of automatically canceling the knowledge data having a smaller storage impact number than a predetermined value.

Additionally, in requiring the above registering, the group of programs which have acquired the knowledge data inform the management program of the symbols defining the acquiring method as well as the acquired knowledge data.

Further, in requiring the above method of use, the group of programs using the knowledge data inform the management program of the symbols defining the object in which the knowledge data is used as well as the knowledge data.

First, when the processing module 105 is activated, whether the object of activation is a requirement of registration of knowledge data is decided (123). If it is 'YES', the time when the knowledge data has been acquired is obtained (125), and an acquired impact table 107 consisting of acquiring methods and the corresponding storage impact numbers is read in from the store medium 5 (127).

Thereafter, a set of the knowledge data, and its storage impact number and its acquired time thus obtained and written in the medium 19 for storing the knowledge data management records (129).

If it is 'NO', whether it is a requirement of using the knowledge data is decided (131).

If it is 'YES', the knowledge data management records are read in from the storage medium 19 (135). Further, the use impact table 109 including the object in which the knowledge data is used and the changed value is read in (135). On the basis of this, the storage impact number is changed (137), and the knowledge data management records are written in the storage medium (139). Thus, the processing in the module 105 is ended.

The processing in response to the requirements other than the above registering and using is performed in the same manner as in the first embodiment.

In this way, the changed value or the changing method for a storage impact number based on the acquiring method or the use thereof can be relatively easily set.

I claim:

1. A knowledge data management apparatus comprising:
   (a) means for inputting knowledge data which can be used as a data base into a storage device;
   (b1) means for determining a storage impact number on the basis of kinds of methods of acquiring knowledge data, said storage impact number representing a degree of importance for maintaining storage of said knowledge data;
   (b2) means for digitizing said storage impact number;
   (c) means for storing said storage impact number as well as said knowledge data;
   (d1) means for inputting a value used for management of an amount of said knowledge data stored in said storage device;
   (d2) means for comparing said storage impact number with said inputted value;
   (e) means for selecting knowledge data to be canceled among said stored knowledge data on the basis of said comparison; and
   (f) means for canceling said selected knowledge data from said storage device.

2. A knowledge data management apparatus according to claim 1, further comprising means for reducing storage impact number of each knowledge data in accordance with its elapsed storage time.

3. A knowledge data management apparatus according to claim 1, further comprising:
   means for counting frequency of use, by a user of said apparatus, of said stored knowledge data; and
   means for changing a storage impact number in accordance with the frequency of use by said user of a corresponding knowledge data.

4. A knowledge data management apparatus according to claim 1, further comprising:
   means for setting a new method of changing said storage impact number in accordance with purposes for which said knowledge data is used by a user of said apparatus; and
   means for changing said storage impact number on the basis of said newly set changing method.

5. A knowledge data management apparatus according to claim 4, wherein said setting means includes;
   (a) means for storing tables representing correspondence between purposes for which said knowledge data is used and methods of changing a storage impact number, and
   (b) means for setting the method for changing a storage impact number on the basis of said tables.

6. A knowledge data management apparatus according to claim 1, wherein said selecting means includes means for selecting knowledge data having a storage impact number which is smaller than a predetermined value.

7. A knowledge data management apparatus according to claim 1, wherein said selecting means includes means for selecting knowledge data having a storage impact number which is smaller than a value inputted by a user of said apparatus.

8. A knowledge data management apparatus according to claim 1, wherein said selecting means includes means for selecting knowledge data having a minimum storage impact number.

9. A knowledge data management apparatus according to claim 1, wherein said means for digitizing includes means for providing knowledge data acquired through an interactive inputting operation with a higher storage impact number than a storage impact number of knowledge data acquired through operations other than said interactive inputting operation.

10. A knowledge data management apparatus according to claim 1, wherein said means for digitizing includes means for providing inputted knowledge data with a storage impact number of a predetermined constant value.

11. A knowledge data management apparatus according to claim 1, wherein said means for digitizing includes:
    (a) means for storing tables representing correspondence between said kinds of acquiring methods and storage impact numbers, and
    (b) means for providing acquired knowledge data with a storage impact number on the basis of said tables.

12. A knowledge data management apparatus according to claim 1, wherein said canceling means includes means for transferring knowledge data to be canceled to another storage means for data retention.

13. A knowledge data management method comprising the steps of:
    (a) inputting knowledge data which can be used as a data base into a storage device;
    (b1 determining a storage impact number on the basis of kinds of methods of acquiring knowledge data, said storage impact number representing a degree of importance for maintaining storage of said knowledge data;
    (b2) digitizing said storage impact number;
    (c) storing said storage impact number as well as said knowledge data;
    (d1) inputting a value used for management of an amount of said knowledge data stored in said storage device;
    (d2) comparing said storage impact number to said inputted value;
    (e) selecting knowledge data to be canceled among said stored knowledge data on the basis of said comparison; and
    (f) canceling said selected knowledge data from said storage device.

14. A knowledge data management method according to claim 13, wherein said selecting step includes the step of:
    selecting knowledge data having a storage impact number which is smaller than a predetermined value.

15. A knowledge data management method according to claim 13, wherein said selecting step includes the step of:
    selecting knowledge data having a storage impact number which is smaller than a value inputted by a user.

16. A knowledge data management method according to claim 13, wherein said selecting step includes the step of selecting knowledge data having a minimum storage impact number.

17. A knowledge data management method according to claim 13, wherein said digitizing step includes the step of:

providing knowledge data acquired through an interactive inputting operation with a higher storage impact number than a storage impact number of knowledge data acquired through operations other than said interactive inputting operation.

18. A knowledge data management method according to claim 13, wherein said digitizing step includes the step of:

providing inputted knowledge data with a storage impact number of a predetermined constant value.

19. A knowledge data management method according to claim 13, wherein said digitizing step includes the steps of:

(a) storing tables representing correspondence between said kinds of acquiring methods and storage impact numbers, and (b) providing said acquired knowledge data with a storage impact number on the basis of said tables.

20. A knowledge data management method according to claim 13, wherein said canceling step includes the step of:

transferring knowledge data to be canceled to another storage means for data retention.

21. A knowledge data management method according to claim 13, said method comprising the following step, between steps (c) and (d) of claim 13 of:

(1) setting a new method of changing a storage impact number in accordance with purposes for which said knowledge data is used; and (2) changing said impact numbers on the basis of said newly set changing method.

22. A knowledge data management method according to claim 21, wherein said setting step includes the steps of:

(a) storing tables representing correspondence between purposes for which said knowledge data is used and methods of changing a storage impact number, and (b) setting the method for changing a storage impact number on the basis of said tables.

23. A knowledge data management method according to claim 21, said method comprising the following steps, between step (2) of claim 21 and step (d) of claim 13 of:

(3) reducing storage impact number of each knowledge data in accordance with its storage elapsed time; and (4) changing a storage impact number in accordance with frequency of use of its corresponding knowledge data.

24. A knowledge data management method according to claim 13, said method comprising the following step, between steps (c) and (d) of claim 13 of:

reducing storage impact number of each knowledge data in accordance with its elapsed storage time.

25. A knowledge data management method according to claim 13, said method comprising the following step, between steps (c) and (d1) of claim 13 of:

changing a storage impact number in accordance with frequency of use of its corresponding knowledge data.

* * * * *